Sept. 23, 1941.     B. M. REYNOLDS     2,256,497
PROCESS OF PURIFYING AND CONCENTRATING FORMALDEHYDE SOLUTIONS
Filed Jan. 12, 1937
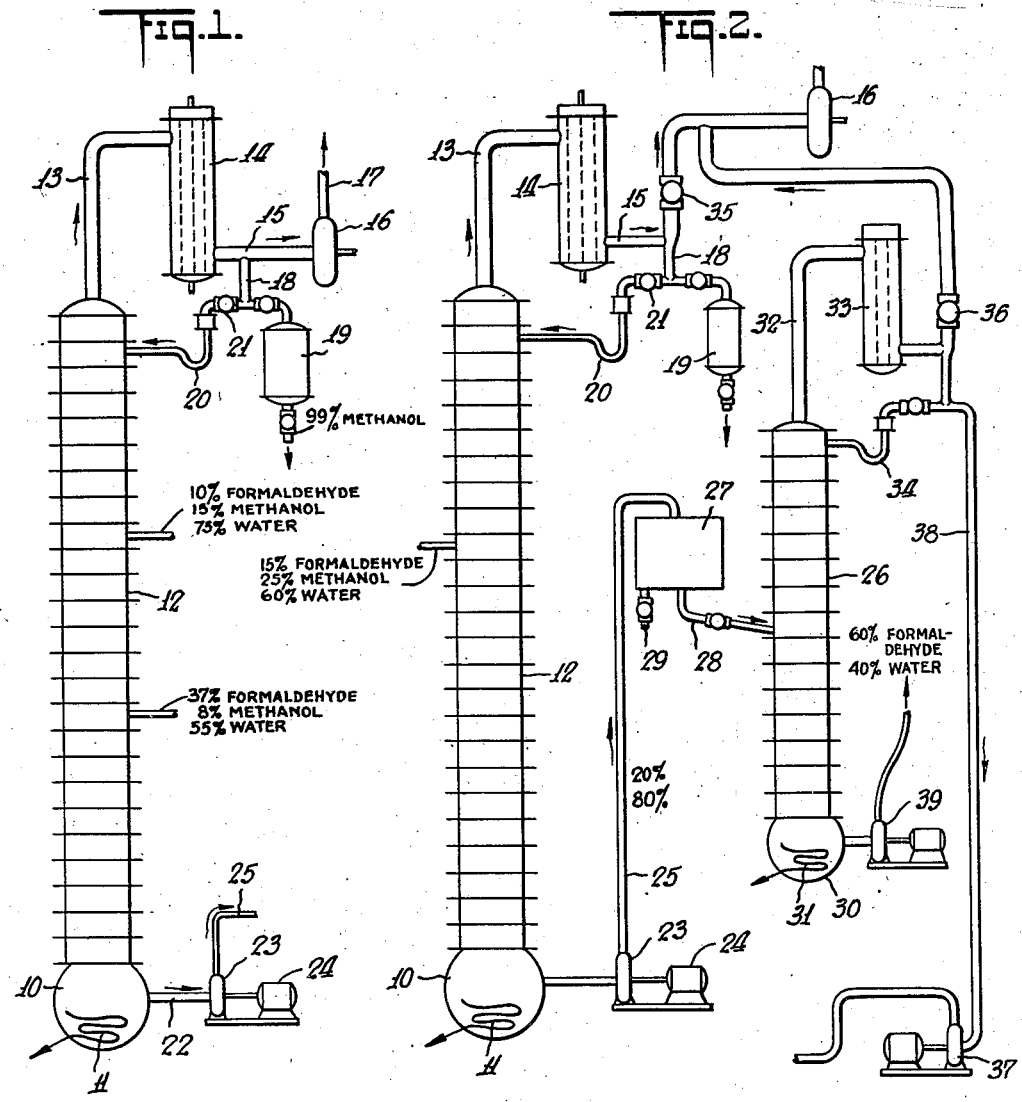
INVENTOR
Blythe M. Reynolds
BY
ATTORNEYS Patented Sept. 23, 1941

2,256,497

UNITED STATES PATENT OFFICE 2,256,497

PROCESS OF PURIFYING AND CONCENTRATING FORMALDEHYDE SOLUTIONS

Blythe M. Reynolds, Upper Montclair, N. J., assignor to Heyden Chemical Corporation, New York, N. Y., a corporation of New York Application January 12, 1937, Serial No. 120,189

7 Claims. (Cl. 202—39)

In the commercial manufacture of formaldehyde it is common to effect catalytic oxidation or hydrogenation of methanol or other raw material in vapor phase and to absorb the formaldehyde vapors in water to separate them from the relatively large volumes of inert gas. During such absorption the unconverted methanol is likewise absorbed, and in order to obtain the maximum recovery of the formaldehyde it is customary to use such a quantity of water as will leave a part of the formaldehyde and methanol in the form of a solution much more dilute than is desired for a commercial product. The so-called formaldehyde of commerce consists of about 37% formaldehyde and 8 to 10% of methanol by weight, the balance being water.

Although the dilute solution obtained by the absorption may be used for certain chemical reactions, its use is limited, and it is highly desirable to obtain the formaldehyde in far more concentrated solution. For many purposes a water solution of formaldehyde of 25% to 40% by weight and free from methanol is desired. This can be produced from paraformaldehyde containing 95% or better of formaldehyde, but obtaining the formaldehyde solution in this manner is relatively expensive.

The main object of my invention is to provide a simple, inexpensive and continuous process whereby water solutions of formaldehyde and methanol may be treated to remove the methanol and to leave a water solution of methanol free formaldehyde.

A further object is to provide a simple method whereby the concentration of a formaldehyde solution may be increased to the desired extent independent of, or as a part of, a removal of methanol. By means of my invention a solution of formaldehyde free from methanol, but without substantial water removal, may be obtained, or water may be removed to give formaldehyde concentrations up to 60% which by slow evaporation may be converted into paraformaldehyde.

Many distillation processes have been proposed for the concentration of dilute formaldehyde solutions, but all such processes with which I am familiar are such that they do not remove the alcohol because the formaldehyde is taken off as a vapor and this vapor will contain all or a major portion of the alcohol. In the processes heretofore proposed dilute formaldehyde solutions cannot be concentrated in the still, as the formaldehyde passes over and is collected in the distillate.

In carrying out my invention I am able to remove all or substantially all of the methanol in the distillate, leaving the formaldehyde in the still, from which it may be withdrawn as a solution substantially free of methanol. Formaldehyde solutions so obtained and free of methanol can be further treated in accordance with my invention to effect a concentration of the formaldehyde up to approximately 60% by weight, as I am able to remove the methanol without substantially changing the relative proportions of formaldehyde and water.

As an important feature of my process the distillation is carried out under a partial vacuum, and under these conditions the formaldehyde may be retained in or refluxed into the still rather than being drawn off as vapors which are richer in formaldehyde than the original liquor. At atmospheric pressure it is not possible to increase the concentration of a formaldehyde water mixture beyond about 23% of formaldehyde because with that percentage of formaldehyde and water a constant boiling mixture is formed and further concentration is impossible.

I have discovered that no such constant boiling mixture is obtained when operating under sufficient subatmospheric pressure and the desired degree of concentration may be obtained.

In the accompanying drawing I have illustrated somewhat diagrammatically apparatus which may be employed in carrying out my improved process. In this drawing:

Fig. 1 shows an apparatus which may be employed for obtaining methanol free formaldehyde without substantial concentration of the formaldehyde in water, and In Fig. 2 there is shown an apparatus which may be employed both for removing the methanol and concentrating the residual formaldehyde solution.

In the apparatus shown in Fig. 1 there is employed a still 10 which may be heated in any suitable manner as for instance by means of a steam coil 11. Above the still is a fractionating column 12. The column is preferably of the bubble plate type. The upper end of the column is connected by a pipe 13 to a water cooled condenser 14 and the vapor outlet from this condenser is connected by a conduit 15 to a vacuum pump 16 which is capable of maintaining a 20 inch vacuum or ⅓ atmosphere absolute pressure. The outlet 17 of the pump may be connected to a further condenser not shown where any alcohol vapor carried through the pump may be condensed and recovered.

The conduit 15 has a drain outlet 18 which connects to a receiver 19 for the recovered methanol and to a conduit 20 for returning reflux to the upper end of the column 12. This conduit may be provided with a valve 21 and preferably has the usual liquid trap.

As one method of using the apparatus a weak formaldehyde solution, such as one containing 10% formaldehyde, 15% methanol and 75% water, may be delivered to the upper part of the column below the point of return of reflux condensate and a more concentrated formaldehyde solution, such for instance as one containing 37% formaldehyde, 8% methanol and 55% water, may be delivered to the column at a lower point. These solutions may be delivered in varying relative proportions and other strengths may be employed, but if it is desired to produce a product having 30% formaldehyde, 70% water and no methanol, the solutions delivered to the column and the relative proportions of water to methanol should be proportioned so that the total formaldehyde and water as delivered from the apparatus will be in the desired proportions.

The product containing the 30% formaldehyde and 70% water may be continuously withdrawn from the still through a conduit 22 by a pump 23 which is illustrated as being driven by a suitable motor 24.

With the apparatus above described and with the formaldehyde methanol water mixtures delivered at the proper places in the column and by maintaining a vacuum of approximately 20 inches and maintaining the condenser 14 at the temperature of ordinary condenser water, the apparatus may be operated continuously to collect a substantially 99% methanol solution in the receiver 19 and substantially free (not over 1%) of formaldehyde, and a solution containing 30% formaldehyde and substantially free (about 0.2%) of methanol may be delivered by the pump 23 through the discharge conduit 25. In many cases it is not objectionable to have slightly more formaldehyde in the separated methanol or slightly more methanol in the separated formaldehyde.

The extent of purity will vary with the rate of feed and the rate of withdrawal of the overhead product and the bottom product.

Obviously by delivering feeds of different degrees of formaldehyde concentration, or by delivering these in different relative proportions, or by delivering a different feed, a product having a different formaldehyde concentration will result.

The apparatus illustrated in Fig. 2 is similar to that illustrated in Fig. 1, except that a second column 26 is employed. The product of the first column delivered through the pipe 25 may be conducted directly into the second column intermediate of the upper ends of the latter, or may be delivered to a storage tank 27 and withdrawn from there to the column 26 through a pipe 28. If the product of the first still is desired, it may be withdrawn from the storage tank through the outlet 29. Obviously the pipes 28 and 29 are provided with suitable valves.

The second column 26 is connected to a still 30 which has suitable means for heating it, as for instance a steam coil 31, and the top of the column is connected by a pipe 32 to a water cooled condenser 33 from which a portion of the condensate may return through the trapped line 34 to the top of the column 26.

The vacuum pump 16 may be connected to the lower end of the condenser 33 as well as to the condenser 14 so as to pull a vacuum on both columns. The pipe connections may have suitable valves 35 and 36 whereby the degree of vacuum in the two columns may be varied if desired. The portion of the condensate which is not returned to the upper end of the column may be drawn off from the condenser 33 by a suction pump 37 through a pipe line 38.

With this apparatus and by delivering a feed, for instance one containing 15% formaldehyde, 25% methanol and 60% water, to the lower portion of the upper half of the column, and by maintaining the vacuum above referred to, and heating the stills to insure proper vaporization at that vacuum, substantially all of the methanol may be collected approximately 99% pure in the receiver 19. A solution containing approximately 20% formaldehyde and 80% water may be withdrawn from the bottom of the first column and delivered by the pump 23 to the second column. A product containing approximately 60% formaldehyde and 40% water may be withdrawn from the bottom of the second column by a pump 39, and a very weak formaldehyde solution may be withdrawn by the pump 37. If the method and apparatus be 85% efficient, then this weak solution comprising substantially all of the water will contain only about 5½% of formaldehyde. If this very weak formaldehyde solution contains less than 23% formaldehyde, it may be concentrated to that strength as the distillate, by distillation at ordinary atmospheric pressure and then used to supplement the feed to the first column.

By means of my improved process, I am able to obtain a concentrated formaldehyde solution free of methanol from a dilute solution containing methanol, and substantially all of the methanol can be separated and obtained of a high degree of purity.

Having thus described my invention, what I claim as new and desire to secure by Letters Patent is:

1. The process of obtaining a concentrated methanol free solution of formaldehyde from a dilute solution composed essentially of formaldehyde, methanol and water, which includes delivering the dilute solution to a fractionating column intermediate of its ends, refluxing condensate at the top of the column and returning it to the column until such time as it is substantially pure methanol, heating the solution at the bottom of the column, withdrawing solution of formaldehyde in water substantially free from methanol from the bottom of the column and delivering it to a second fractionating column, refluxing condensate at the top of the second column, withdrawing concentrated formaldehyde from the bottom of the second column, withdrawing methanol free from formaldehyde from the condensate at the upper end of the first column, withdrawing weak formaldehyde solution from the condensate at the upper end of the second column, and maintaining both of said columns under an absolute pressure of about ⅓ atmosphere.

2. The method of removing substantially all of the methanol from a solution composed essentially of methanol, formaldehyde and water, which includes distilling said solution and subjecting the vapors to fractional condensation in a column under a vacuum of about 20″ of mercury to drive off all of the methanol, cooling the vapors passing off from the top of the column to a temperature at which substantially all of the formaldehyde and water in such vapors will be condensed, returning the condensate to the top of the column as a reflux until such time as the condensate contains substantially no formaldehyde or water, and thereafter continuously returning only a portion of the condensate to the column, while withdrawing the remaining portion comprising methanol substantially free of formaldehyde and water, withdrawing water solution of formaldehyde substantially free of methanol from the bottom, and continuously delivering the methanol formaldehyde water solution to the column intermediate of its ends.

3. The process of obtaining methanol of a high degree of purity from a water solution of formaldehyde and methanol which solution is substantially free of other ingredients, which includes delivering said solution to a fractionating column intermediate of its ends, maintaining a vacuum in said column of about 20" of mercury, heating the solution collecting at the bottom of the column, condensing vapors passing off the top of the column, returning the condensate to the upper end of the column until such time as it is substantially free of water and formaldehyde, thereafter withdrawing a portion of the condensate as methanol substantially free from water and formaldehyde, and withdrawing from the bottom of the column substantially all of the formaldehyde and substantially all of the water.

4. The process of obtaining substantially pure methanol from a solution consisting essentially of formaldehyde, methanol and water, which includes continuously delivering the solution to a fractionating column intermediate of the ends of the latter, maintaining a distillation at the lower end of the column, maintaining the column under a pressure substantially below atmospheric, maintaining reflux condensation at the top of the column until the solution at the bottom of the column is substantially free of methanol and contains substantially all of the formaldehyde and substantially all of the water of the dilute solution, and thereafter continuously withdrawing said water solution of formaldehyde from the bottom of the column and substantially pure methanol from the top of the column.

5. The process of removing substantially all of the methanol free from water and formaldehyde from a solution of methanol and formaldehyde in water, which solution is substantially free of other ingredients, which includes continuously delivering said solution to a fractionating column intermediate of its ends, maintaining said column under a pressure of about $\frac{1}{3}$ atmosphere absolute, heating the solution at the bottom of the column to vaporize off the methanol, condensing the vapors passing off from the top of the column, and returning the condensate to the upper portion of the column as a reflux, until the condensate is substantially pure methanol, and then continuously withdrawing a portion of the condensate of substantially pure methanol, and withdrawing formaldehyde solution in substantially all of the original water and substantially free of methanol from the bottom of said column.

6. The continuous process of obtaining methanol of a high degree of purity from a water solution of formaldehyde and methanol substantially free of other ingredients, which includes continuously supplying said solution to a fractionating column intermediate of its ends, heating said solution at the bottom of said column to form vapors passing up through said column, condensing the vapors passing from the top of the column under a pressure substantially below atmospheric pressure and returning the condensate to the upper portion of the column as a reflux until the condensate is substantially pure methanol, thereafter returning only a portion of the condensate and withdrawing the remainder, controlling the ratio of the withdrawn and returned portions to obtain a condensate of methanol substantially free of water and formaldehyde, and withdrawing solution containing substantially all of the formaldehyde and substantially all of the water from the bottom of said column.

7. The method of removing all of the methanol from a methanol-formaldehyde-water mixture substantially free of other ingredients and obtaining it substantially free of formaldehyde and water, which comprises delivering said mixture to a fractionating column intermediate of its ends, fractionally distilling the mixture under an absolute pressure of about $\frac{1}{3}$ atmosphere, maintaining substantially complete return of condensed vapor to the top of the column until the mixture at the bottom of the still is substantially free of methanol, and thereafter returning a portion of the condensate to the top of the column and withdrawing the remainder from the condenser as pure methanol.

BLYTHE M. REYNOLDS.